US012792293B2

United States Patent

Chen et al.

(12) United States Patent
(10) Patent No.: US 12,792,293 B2
(45) Date of Patent: Nov. 10, 2026

(54) DISPLAY DEVICE AND AUDIO PLAYING METHOD

(71) Applicant: Qisda Corporation, Taoyuan City (TW)

(72) Inventors: Li-Chun Chen, Taoyuan City (TW); Bo-Wei Shih, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 128 days.

(21) Appl. No.: 18/922,343

(22) Filed: Oct. 21, 2024

(65) Prior Publication Data

US 2025/0138774 A1 May 1, 2025

(30) Foreign Application Priority Data

Nov. 1, 2023 (CN) ......................... 202311440130.2

(51) Int. Cl.
*G06F 3/16* (2006.01)

(52) U.S. Cl.
CPC .............. *G06F 3/162* (2013.01); *G06F 3/165* (2013.01)

(58) Field of Classification Search
CPC ................................. G06F 3/162; G06F 3/165
See application file for complete search history.

(56) References Cited

U.S. PATENT DOCUMENTS

2025/0217101 A1* 7/2025 Kim ........................ G06F 3/165

FOREIGN PATENT DOCUMENTS

JP 2014042163 A * 3/2014
JP 2015165710 A * 9/2015

OTHER PUBLICATIONS

Machine translation of JP2015165710A (Year: 2015).*
Machine translation of JP2014042163A (Year: 2014).*

* cited by examiner

*Primary Examiner* — Andrew Sniezek
(74) *Attorney, Agent, or Firm* — JCIPRNET

(57) ABSTRACT

This disclosure provides a display device and an audio playing method. The display device includes a processor, a first communication interface, and a second communication interface. The first communication interface is electrically connected to the processor and a player device. The second communication interface is electrically connected to the processor. In response to the processor receiving an audio detection command from the player device through the first communication interface, the processor determines whether a connection port of the second communication interface has a preset voltage. In response to the processor determining that the connection port of the second communication interface does not have the preset voltage, the processor responds to the audio detection command to occupy an audio system logical address. In response to the processor determining that the connection port of the second communication interface has the preset voltage, the processor ignores the audio detection command.

20 Claims, 3 Drawing Sheets

DISPLAY DEVICE AND AUDIO PLAYING METHOD

CROSS-REFERENCE TO RELATED APPLICATION

This application claims the priority benefit of China application serial no. 202311440130.2, filed on Nov. 1, 2023. The entirety of the above-mentioned patent application is hereby incorporated by reference herein and made a part of this specification.

BACKGROUND

Technical Field

This disclosure relates to a multimedia playing technology, and particularly to a display device and an audio playing method.

Description of Related Art

After a general audiovisual player device is connected to a display, when the audiovisual player device does not detect an audio device, the audiovisual player device automatically plays audio. If the user connects the audio device later, the audio device is not able to perform audio playing. In this regard, the audio device can only be used to play audio after reconnecting the audiovisual player device.

SUMMARY

This disclosure provides a display device and an audio playing method, which can effectively play audio.

A display device of this disclosure includes a processor, a first communication interface, and a second communication interface. The first communication interface is electrically connected to the processor and a player device. The second communication interface is electrically connected to the processor. In response to the processor receiving an audio detection command from the player device through the first communication interface, the processor determines whether a connection port of the second communication interface has a preset voltage. In response to the processor determining that the connection port of the second communication interface does not have the preset voltage, the processor responds to the audio detection command to occupy an audio system logical address. In response to the processor determining that the connection port of the second communication interface has the preset voltage, the processor ignores the audio detection command.

An audio playing method of this disclosure includes: in response to a display device receiving an audio detection command from a player device through a first communication interface, determining whether a connection port of a second communication interface has a preset voltage by the display device; in response to the display device determining that the connection port of the second communication interface does not have the preset voltage, responding to the audio detection command by the display device to occupy an audio system logical address; and in response to the display device determining that the connection port of the second communication interface has the preset voltage, ignoring the audio detection command by the display device.

Based on the above, the display device and the audio playing method of this disclosure can automatically determine whether to occupy the audio system logical position in advance to effectively prevent the player device from occupying the audio system logical position and causing the subsequently installed speaker device to be unable to effectively playing audio.

In order to make the above-mentioned features and advantages of this disclosure more obvious and easier to understand, embodiments are given below and described in detail with reference to the accompanying drawings.

DETAILED DESCRIPTION OF DISCLOSED EMBODIMENTS

Figure 1:
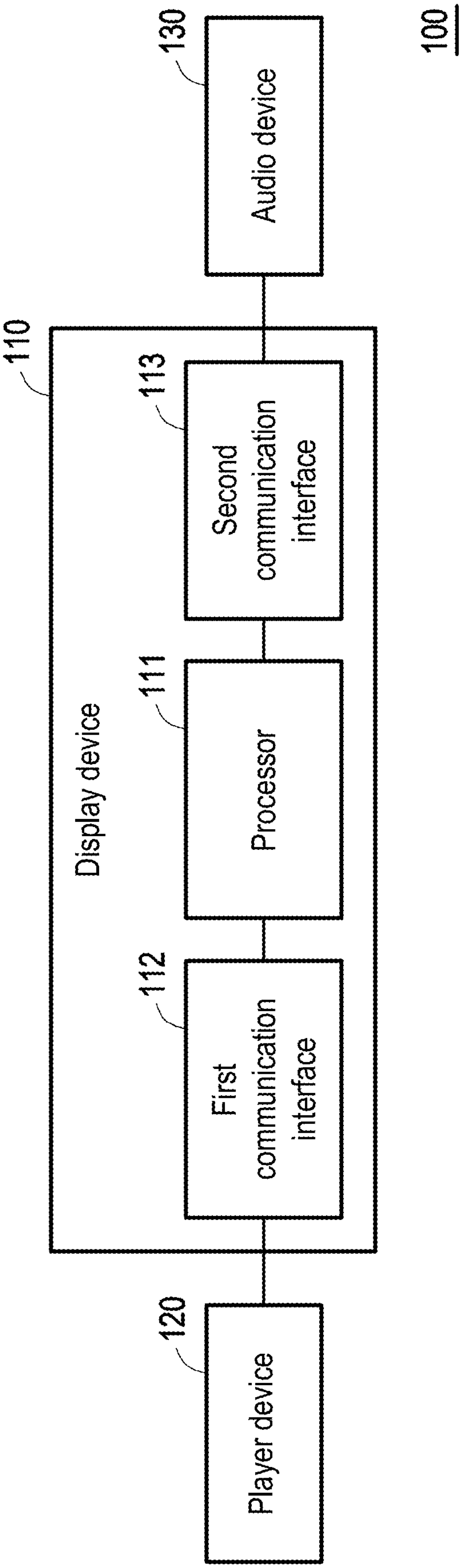
FIG. 1 is a schematic diagram of a multimedia system according to an embodiment of this disclosure.

In order to make the content of this disclosure easier to understand, the following embodiments are given as examples according to which this disclosure may be implemented. In addition, wherever possible, elements/components/steps with the same reference numerals in the drawings and embodiments represent the same or similar parts.

FIG. 1 is a schematic diagram of a multimedia system according to an embodiment of this disclosure. Please refer to FIG. 1. A multimedia system 100 includes a display device 110, a player device 120, and an audio device 130. The display device 110 includes a processor 111, a first communication interface 112, and a second communication interface 113. The processor 111 is coupled (or electrically connected) to the first communication interface 112 and the second communication interface 113. The display device 110 may be connected to the player device 120 through the first communication interface 112. The display device 110 may be connected to the audio device 130 through the second communication interface 113.

In this embodiment, the display device 110 may be a projector, but this disclosure is not limited thereto. In an embodiment, the display device 110 may also be a display. The player device 120 may be an audiovisual player with an audio playing function and may have an audio playing unit. In this embodiment, the processor 111 may include a system on a chip (SOC) or may include, for example, a central processing unit (CPU), other programmable general-purpose or specific-purpose microprocessors, digital signal processors (DSP), programmable controllers, application specific integrated circuits (ASIC), programmable logic devices (PLD), other similar processing apparatuses, or a combination of these apparatuses. The first communication interface 112 and the second communication interface 113 may respectively be a high definition multimedia interface (HDMI), but this disclosure is not limited thereto.

Figure 2:
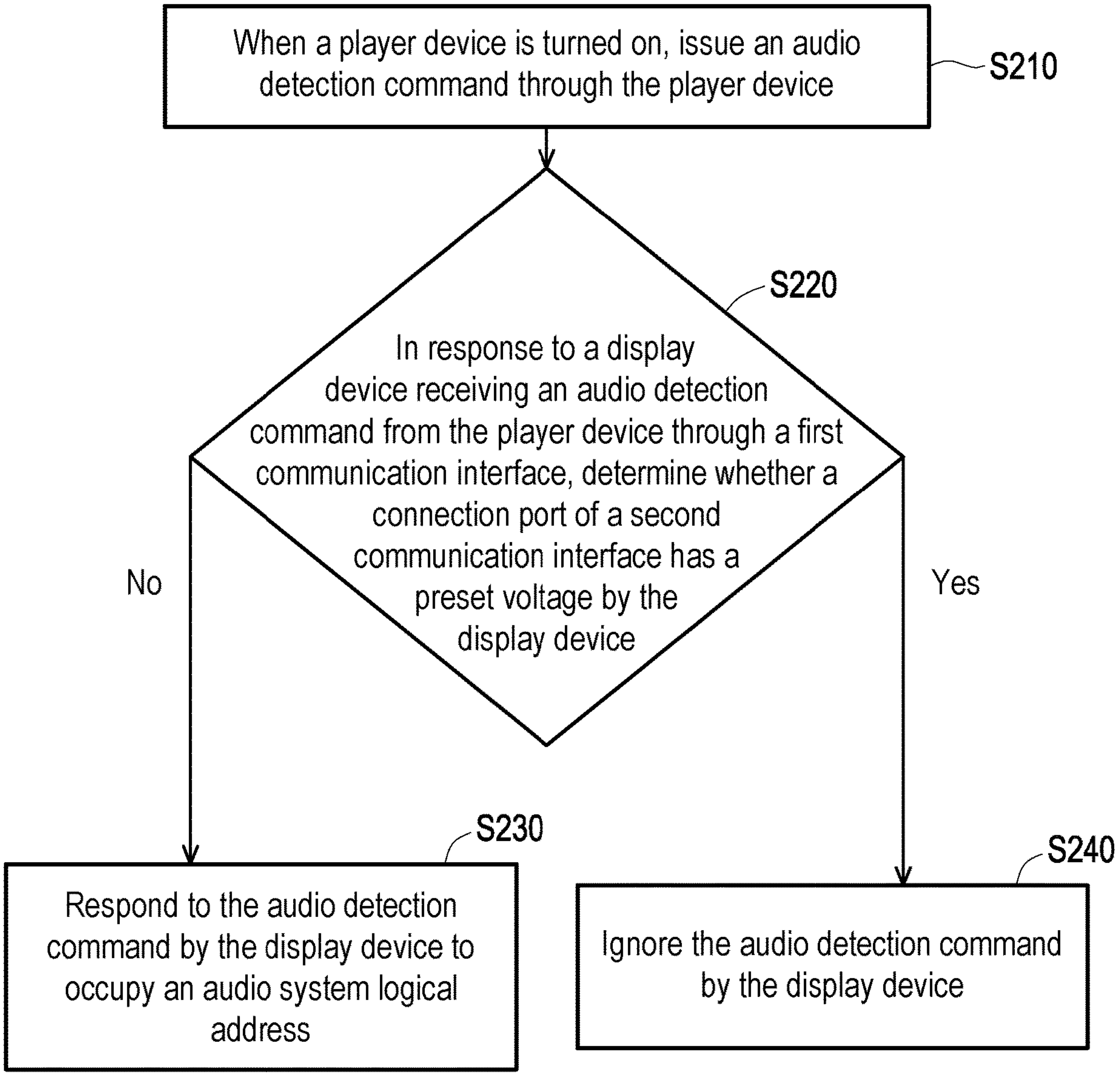
FIG. 2 is a flow chart of an audio playing method according to an embodiment of this disclosure.

FIG. 2 is a flow chart of an audio playing method according to an embodiment of this disclosure. Please refer to FIG. 1 and FIG. 2. The multimedia system 100 may, for example, execute steps S210 to S230 below. The player device 120 may first be connected to the display device 110 through the first communication interface 112. In step S210, when the player device 120 is turned on, the player device 120 issues an audio detection command. Furthermore, the player device 120 may provide an image signal to the display device 110 to play an image. In this embodiment, the audio detection command is generated based on the consumer electronics control (CEC) protocol. In step S220, in response to the display device 110 receiving the audio detection command from the player device 120 through the first communication interface 112, the display device 110 determines whether a connection port of the second communication interface 113 has a preset voltage, wherein the preset voltage may be 5 volts. In this regard, the connection port may be, for example, an audio return channel (ARC) connection port (the first communication interface 112 may also include an ARC connection port), but this disclosure is not limited thereto. The connection port may also be a connection port of other types or purposes. In this embodiment, the display device 110 may confirm whether the second communication interface 113 is connected to the audio device 130 through determining whether the connection port has voltage.

If not, in step S230, in response to the display device 110 determining that the connection port of the second communication interface 113 does not have the preset voltage, the display device 110 responds to the audio detection command to occupy an audio system logical address. In this way, the player device 120 does not play audio and may output an audio signal to the display device 110. Moreover, in an embodiment, if the display device 110 also includes a speaker device, in response to the processor 111 occupying the audio system logical address, the player device 120 plays audio through the speaker device. The speaker device is electrically connected to the processor 111.

It is noteworthy that after the processor 111 occupies the audio system logical address, when the second communication interface 113 is subsequently electrically connected to the audio device 130, the processor 111 transfers the audio system logical address to the audio device 130, so that the player device 120 may play audio through the audio device 130. In other words, when the multimedia system 100 is not yet connected to the audio device 130, the display device 110 may first occupy the audio system logical address. After the multimedia system 100 is connected to the audio device 130, the audio system logical address is then automatically handed over to the audio device 130. In this way, the multimedia system 100 can effectively prevent the player device 120 from occupying the audio system logical address and causing the subsequently connected audio device 130 to be unable to play audio.

In addition, if yes, in step S240, in response to the display device 110 determining that the connection port of the second communication interface 113 has the preset voltage, the display device 110 ignores the audio detection command. In this regard, since the connection port of the second communication interface 113 has the preset voltage, it means that the second communication interface 113 is electrically connected to the audio device 130, and the audio device 130 responds to the audio detection command to occupy the audio system logical address, so that the player device 120 may play audio through the audio device 130.

Figure 3:
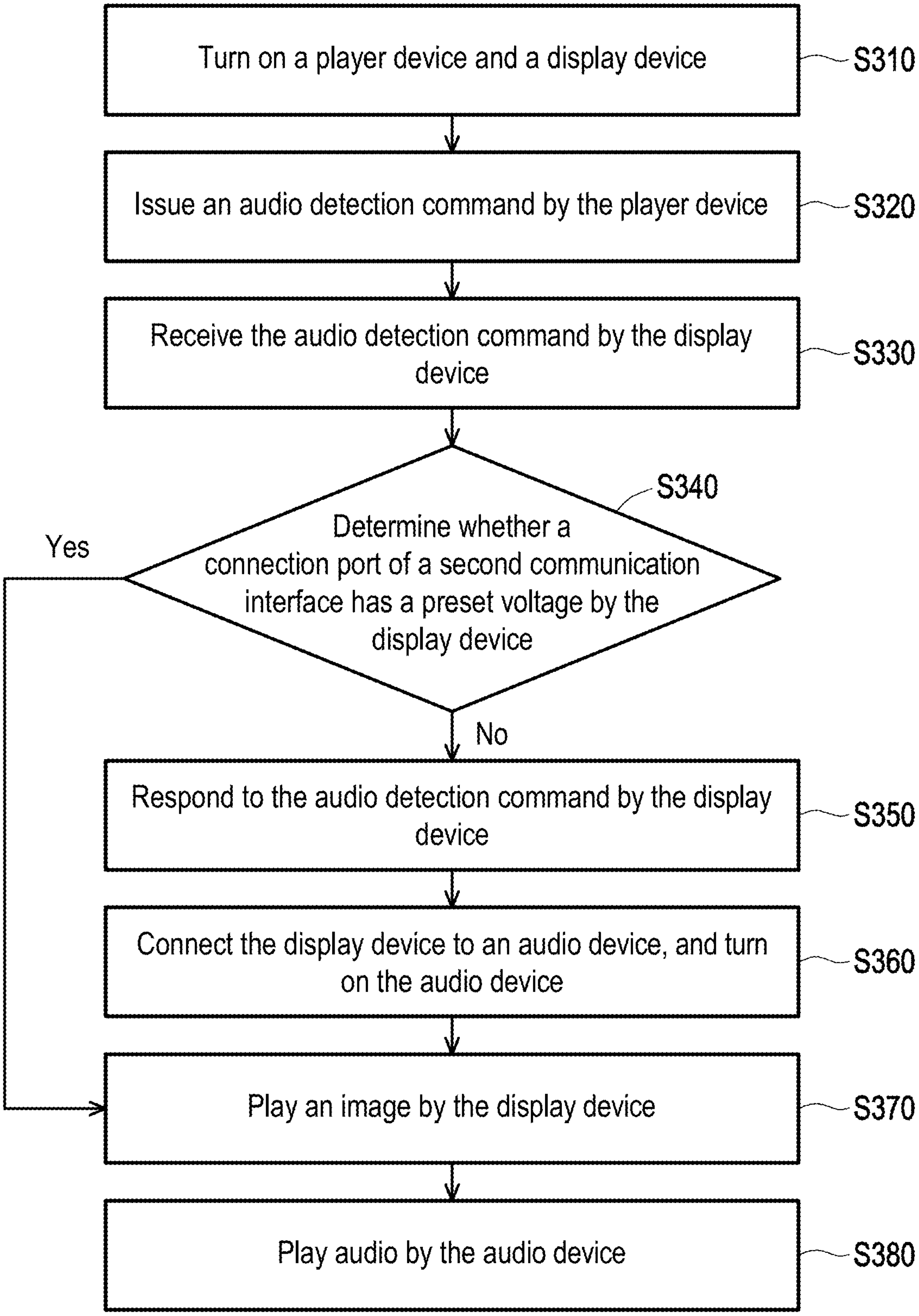
FIG. 3 is a flow chart of an audio playing method according to an embodiment of this disclosure.

FIG. 3 is a flow chart of an audio playing method according to an embodiment of this disclosure. Please refer to FIG. 1 and FIG. 3. Steps S310 to S380 in FIG. 3 illustrate a detailed implementation scenario of the multimedia system 100. In step S310, a user may operate to turn on the player device 120 and the display device 110. In step S320, the player device 120 issues the audio detection command. In step S330, the display device 110 receives the audio detection command. In step S340, the display device 110 may determine whether the connection port of the second communication interface 113 has the preset voltage. If yes, the multimedia system 100 directly executes step S370 and step S380 below. If not, in step S350, the display device 110 occupies the audio system logical address, and the display device 110 responds to the audio detection command. In step S360, the user may connect the display device 110 to the audio device 130 and turn on the audio device 130. The display device 110 automatically hands over the audio system logical address to the audio device 130. In step S370, the display device 110 plays the image according to the image signal provided by the player device 120. In step S380, the audio device 130 plays audio according to the audio signal provided by the player device 120. In this way, the player device 120 does not automatically occupy the audio system logical address, and the subsequently connected audio device 130 can effectively play audio.

In summary, the display device and the audio playing method of this disclosure can automatically occupy the audio system logical position in advance before the audio device is connected to effectively prevent the player device from occupying the audio system logical position, and the audio playing unit of the display device may play audio first. In this way, when the user subsequently connects the audio device to the system, the display device may hand over the audio system logical address to the audio device, and the audio may be normally played through the audio device. From another perspective, when installing an audiovisual playing system, the user may install audio devices in any order and may play audio normally using all the audio devices. The display device of this disclosure can have a high device compatibility.

In summary, the display device and the audio playing method of this disclosure can automatically occupy the audio system logical position in advance before the audio device is connected to effectively prevent the player device from occupying the audio system logical position, and the audio playing unit of the display device may play audio first. In this way, when the user subsequently connects the audio device to the system, the display device may hand over the audio system logical location to the audio device, and the audio may be normally played through the audio device. From another perspective, when installing an audiovisual playing system, the user may install audio devices in any order and may play audio normally using all the audio devices. The display device of this disclosure can have a high device compatibility.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display device, comprising:

a processor;

a first communication interface, electrically connected to the processor and a player device; and a second communication interface, electrically connected to the processor, wherein in response to the processor receiving an audio detection command from the player device through the first communication interface, the processor determines whether a connection port of the second communication interface has a preset voltage, wherein in response to the processor determining that the connection port of the second communication interface does not have the preset voltage, the processor responds to the audio detection command to occupy an audio system logical address, wherein in response to the processor determining that the connection port of the second communication interface has the preset voltage, the processor ignores the audio detection command.

2. The display device according to claim 1, wherein after the processor occupies the audio system logical address, in response to the second communication interface being electrically connected to an audio device, the processor hands over the audio system logical address to the audio device, so that the player device plays audio through the audio device.

3. The display device according to claim 1, wherein in response to the processor determining that the connection port of the second communication interface has the preset voltage, which means that the second communication interface is electrically connected to an audio device, the audio device responds to the audio detection command to occupy the audio system logical address, so that the player device plays audio through the audio device.

4. The display device according to claim 1, when the player device is turned on, the player device issues the audio detection command.

5. The display device according to claim 1, wherein the first communication interface and the second communication interface are respectively a high definition multimedia interface (HDMI).

6. The display device according to claim 1, wherein the connection port is an audio return channel (ARC) connection port.

7. The display device according to claim 1, wherein the audio detection command is generated based on a consumer electronics control (CEC) protocol.

8. The display device according to claim 1, wherein the display device is a projector.

9. The display device according to claim 1, wherein the preset voltage is 5 volts.

10. The display device according to claim 1, further comprising:

a speaker device, electrically connected to the processor, wherein in response to the processor occupying the audio system logical address, the player device plays audio through the speaker device.

11. An audio playing method, comprising:

in response to a display device receiving an audio detection command from a player device through a first communication interface, determining whether a connection port of a second communication interface has a preset voltage by the display device;

in response to the display device determining that the connection port of the second communication interface does not have the preset voltage, responding to the audio detection command by the display device to occupy an audio system logical address; and in response to the display device determining that the connection port of the second communication interface has the preset voltage, ignoring the audio detection command by the display device.

12. The audio playing method according to claim 11, further comprising:

after the display device occupies the audio system logical address, in response to the second communication interface being electrically connected to an audio device, handing over the audio system logical address to the audio device by the display device, so that the player device plays audio through the audio device.

13. The audio playing method according to claim 11, further comprising:

in response to a processor determining that the connection port of the second communication interface has the preset voltage, which means that the second communication interface is electrically connected to an audio device, responding to the audio detection command by the audio device to occupy the audio system logical address, so that the player device plays audio through the audio device.

14. The audio playing method according to claim 11, further comprising:

when the player device is turned on, issuing the audio detection command by the player device.

15. The audio playing method according to claim 11, wherein the first communication interface and the second communication interface are respectively a high definition multimedia interface (HDMI).

16. The audio playing method according to claim 11, wherein the connection port is an audio return channel (ARC) connection port.

17. The audio playing method according to claim 11, wherein the audio detection command is generated based on a consumer electronics control (CEC) protocol.

18. The audio playing method according to claim 11, wherein the display device is a projector.

19. The audio playing method according to claim 11, wherein the preset voltage is 5 volts.

20. The audio playing method according to claim 11, further comprising:

in response to the processor occupying the audio system logical address, playing audio through the speaker device by the player device of the display device.

* * * * *